Feb. 10, 1953      A. E. HILL      2,627,913

AUTOMOBILE AWNING

Filed March 5, 1951

INVENTOR.
A. E. HILL
BY
C. M. McKnight
ATTORNEY

Patented Feb. 10, 1953

2,627,913

UNITED STATES PATENT OFFICE 2,627,913

AUTOMOBILE AWNING

Albert E. Hill, Tulsa, Okla.

Application March 5, 1951, Serial No. 213,900

2 Claims. (Cl. 160—88)

This invention relates to improvements in awnings, and more particularly, but not by way of limitation, to improvements in awnings for automobile windows.

As it is well known, there are several types of automobile awnings presently available to the general public. One of the most popular types of automobile awnings is a retractable awning that may be raised and lowered at the desire of the occupant of the automobile, depending upon the climatic conditions. This type of awning comprises a plurality of arms pivotally secured to the leading and trailing edges of the automobile door with a suitable fabric covering over the arms. It will be readily appreciated that the fabric covering is continuously exposed to rain, snow, and the sun, and after a relatively short period of time becomes faded and discolored, thereby detracting from the appearance of the automobile. Furthermore, the fabric collects dirt very rapidly, and is very difficult to keep clean to present a pleasing appearance. Also, the fabric tends to rot when subjected to rain over a relatively short period of time.

Another popular type of automobile awning is a metal awning that is permanently secured to the upper edge of the automobile door. This type of awning, however, is stationary and affords very little protection to the motorist since it cannot be raised or lowered.

The present invention contemplates a novel retractable automobile awning that may be constructed out of any suitable durable material, such as steel, aluminum, plastic, or the like. The awning comprises a plurality of arcuate leaves or slats pivotally secured to the leading and trailing edges of an automobile door. The innermost leaf is secured to the upper edge of the automobile door, and the remaining leaves may be telescoped into and out of the stationary innermost leaf to raise and lower the awning over the window of the automobile. The awning, being constructed out of a durable material such as metal or plastic, can be easily cleaned and will present a pleasing appearance. Furthermore, it may be chrome plated or painted the same color as the automobile on which it is used. It is also apparent that the awning will not rot or fade, and will have a long service life.

An important object of this invention is to provide a retractable automobile awning.

Another object of this invention is to provide a retractable automobile awning constructed out of metal or plastic materials.

Another object of this invention is to provide a retractable automobile awning that will not be subjected to rotting or fading.

A further object of this invention is to provide a retractable automobile awning that will be durable and may be easily cleaned.

Another object of this invention is to provide a retractable automobile awning that will provide the maximum protection to the motorist when in an extended or lowered position, and will provide an efficient rain guard when in a retracted position.

A still further object of this invention is to provide a retractable automobile awning that may be easily and efficiently installed on an automobile door in the minimum of time, and with the use of a minimum of tools.

Another object of this invention is to provide a retractable automobile awning having a long service life and which may be economically manufactured.

Other objects and advantages of the invention will be evident from the following detailed description, read in conjunction with the accompanying drawings, which illustrate my invention.

Figure 1:
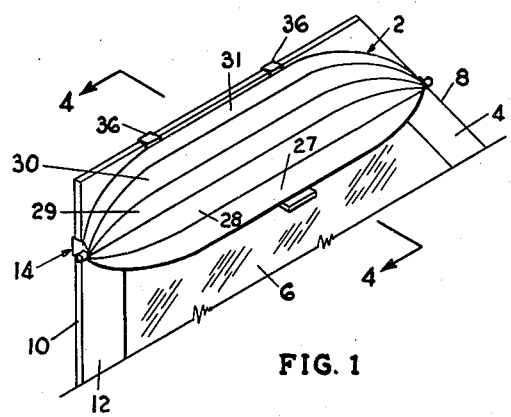
Figure 1 is a perspective view of a novel awning installed on an automobile door.

Referring to the drawings in detail, and particularly Fig. 1, reference character 2 generally designates a novel awning installed on an automobile door 4 over the upper portion of the automobile door window 6. The awning 2 is secured to the leading and trailing edges 8 and 10 respectively of the outer flange 12 of the automobile door 4 by suitable brackets indicated generally at 14.

Figure 5:
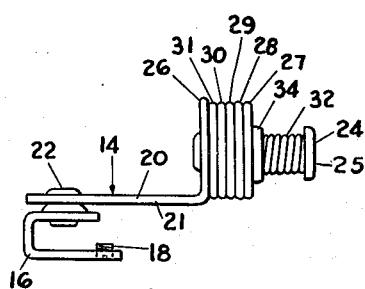
Figure 5 is a detailed view of the end brackets utilized to secure the awning on an automobile door.

Each bracket 14 (see Fig. 5) comprises a U-shaped clip 16 adapted to receive the flange 12 of the automobile door 4. A set screw 18 is provided in each clip 16 and is adapted to contact the automobile door flange 12 to rigidly secure the respective bracket member 14 thereon. An L-shaped member 20 has one arm 21 thereof pivotally secured to the clip 16 by a suitable pivot screw 22 as is well known in the art. A bolt 24 having a head 25 on the outer end thereof is secured in the opposite arm 26 of the member 20 to support the leaves 27 through 31 of the automobile awning 2. Each of the leaves 27 through 31 is curved and extends the length of the automobile door 4, and an aperture (not shown) is provided in each end of each of the leaves to receive the respective bolts 24. A spring 32 is also provided on each bolt 24, and continuously exerts pressure on the ends of the leaves 27 to 31 through the medium of a washer 34 for purposes as will be hereinafter set forth.

The brackets 14 are secured to the door flange 12 in such a position that the bolts 24 are in alignment, thereby providing a common pivotal axis for the awning leaves 27 through 31. The innermost leaf 31 is permanently secured in abutting relationship with the door flange 12 by a pair of suitable clips 36. The clips 36 may be of any suitable construction, and are preferably provided with set screws (not shown) to assure the permanent positioning of the leaf 31 on the door flange 12. The width of the leaves 31 through 27 progressively decrease, the width of the leaf 31 being the greatest, and the width of the leaf 27 being the smallest. Furthermore, the radius of curvature of the leaves 31 through 27 progressively decrease, the leaf 31 having the greatest radius of curvature and the leaf 27 having the smallest radius of curvature. The leaf 27 may therefore be moved into or underneath the leaf 28, and the leaf 28 may be moved into leaf 29, and so on. All of the leaves 27 through 30 may also therefore be moved underneath the leaf 31 when the awning is in a retracted position, as illustrated in Fig. 2, to present a neat and pleasing appearance.

A suitable handle 38 is provided on the central portion of the lower leaf 27 and projects outwardly from the leaf 27 for purposes as will be hereinafter set forth. The outer edge 40 of the leaf 31 is turned downwardly and is adapted to engage the inner upturned edge 42 of the leaf 30 when the leaf 30 is extended, as clearly illustrated in Fig. 4. The outer edges 44, 46 and 48 of the leaves 30, 29 and 28 respectively, are also turned downwardly to engage the upturned inner edges 50, 52 and 54 of the leaves 29, 28 and 27 respectively to prevent the leaves from parting when moved downwardly over the window 6. It will be understood that only a portion of the side edges of the leaves need be distorted, if desired, to preclude a parting of the leaves and provide an effective awning.

*Operation*

Figure 2:
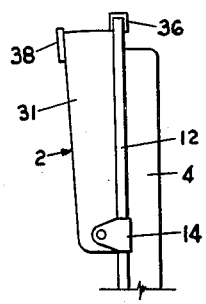
Figure 2 is an end elevational view of the awning installed on an automobile door, illustrating the awning in a retracted position.

Assuming the awning 2 is in a retracted position, as illustrated in Fig. 2, the awning 2 may be lowered by moving the handle 38 downwardly and outwardly. When the lower leaf 27 has been moved from underneath the leaf 31 the inner upturned edge 54 of the leaf 27 contacts the outer downturned edge 48 of the leaf 28 to move the leaf 28 simultaneously with the leaf 27. The inner upturned edge 52 of the leaf 28 will then contact the outer downturned edge 46 of the leaf 29, and so on, until all of the leaves 27 through 30 are moved to the positions illustrated in Fig. 4. The outward and downward movement of the leaves 27 through 30 will be halted when the inner upturned edge 42 of the leaf 30 contacts the outer downturned edge 40 of the stationary leaf 31. It will be understood that the leaves 27 through 30 are pivoted on bolts 24 during their downward and outward movement.

Figure 3:
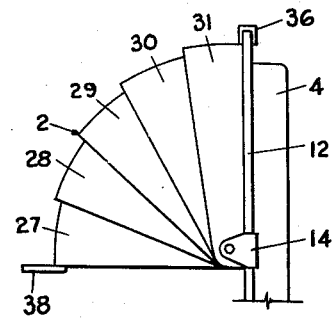
Figure 3 is a view similar to Fig. 2 illustrating the awning in an extended position.
Figure 4:
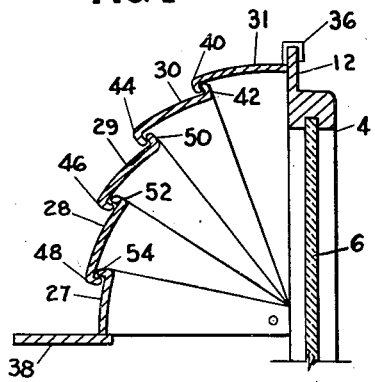
Figure 4 is a cross-sectional view taken along lines 4—4 of Fig. 1.

When the awning 2 is in the extended position, as illustrated in Figs. 1, 3 and 4, the motorist will be afforded the maximum protection from the sun, as well as from rain or snow and the like. The awning 2 will then preclude the entrance of rain or snow into the automobile even though the window 6 is completely lowered.

When it is desired to raise the awning 2, the handle 38 is grasped by the motorist and moved upwardly and inwardly. It will be apparent from an examination of Fig. 4, that the handle 38 will progressively contact the leaves 28, 29 and 30 when moved upwardly and inwardly to pivot the leaves 28, 29 and 30 into their retracted position underneath the fixed leaf 31 as illustrated in Fig. 2. When the awning 2 is in a retracted position, as illustrated in Fig. 2, the awning provides an efficient rain guard to permit a slight opening of the window 6 during a rain storm or the like to prevent the windshield of the automobile from fogging up, and to increase the comfort of the occupants of the automobile.

The springs 32 provided on the bolts 24 of the brackets 14 will retain the ends of the leaves 27 through 31 in contact with each other and in contact with the bracket arms 26 when the leaves are in their retracted position, as illustrated in Fig. 2, as well as when the leaves are partially extended (not shown), or fully extended as illustrated in Figs. 1, 3 and 4. The awning 2 may therefore be fully retracted or extended to any desired degree, according to the desire of the motorist, and will be retained in the desired position by friction induced by the springs 32.

From the foregoing, it is apparent that the present invention provides a novel retractable automobile awning that provides the maximum protection to the motorist when in an extended or lowered position, and provides an efficient rain guard when in a retracted position. Furthermore, since the awning is constructed out of plastic or metallic material, the awning may be easily cleaned, and will not be subjected to rotting or fading. Also, the awning will present a pleasing appearance when either in a retracted or extended position, and may be chrome plated or painted to match the color of the automobile if desired. It is also apparent that the present invention provides a novel retractable automobile awning having a long service life and which may be economically manufactured.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An awning for an automobile door having a window therein, comprising an arcuate leaf of a length to extend substantially the length of the door, clips on said leaf claspingly engaging the upper edge of the door and securing the leaf in abutting relation to the door over the upper part of the window, a plurality of smaller arcuate leaves disposed under the first said leaf, each end of each of said leaves having an aperture therein, a bolt inserted through said apertures at each end of said leaves to provide pivotal supports for said leaves, and clamp means engaging the forward and trailing edges of the door supporting said bolts in aligned relationship.

2. An awning for an automobile door having a window therein, comprising an arcuate leaf of a length to extend substantially the length of the door, clips on said leaf claspingly engaging the upper edge of the door and securing the leaf in abutting relation to the door over the upper part of the window, a plurality of smaller arcuate leaves disposed under the first said leaf, each end of each of said leaves having an aperture therein, a bolt inserted through said apertures at each end of said leaves to provide pivotal supports for said leaves, clamp means engaging the forward and trailing edges of the door supporting said bolts in aligned relationship, a head on each bolt in spaced relation to the respective clamp means, and a helical spring surrounding each bolt engaging the adjacent leaf and the head on the associated bolt continually urging the ends of said leaves into close contact with each other and against the clamp means.

ALBERT E. HILL.

REFERENCES CITED

The following references are of record in the file of this patent:

UNITED STATES PATENTS

| Number | Name | Date |
| --- | --- | --- |
| 1,450,142 | Dietrich | Mar. 27, 1923 |
| 2,213,141 | Mather | Aug. 27, 1940 |
| 2,538,286 | Todd | Jan. 16, 1951 |